United States Patent [19]

Meyer et al.

[11] Patent Number: 4,579,210

[45] Date of Patent: Apr. 1, 1986

[54] PRESSURE PLATE UNIT FOR A MOTOR VEHICLE FRICTION CLUTCH

[75] Inventors: Alfred Meyer; Klaus Elsner, both of Schweinfurt, Fed. Rep. of Germany

[73] Assignee: Fichtel & Sachs AG, Schweinfurt, Fed. Rep. of Germany

[21] Appl. No.: 546,055

[22] Filed: Oct. 27, 1983

[30] Foreign Application Priority Data

Oct. 30, 1982 [DE] Fed. Rep. of Germany ....... 3240318

[51] Int. Cl.⁴ ............................................. F16D 13/44
[52] U.S. Cl. ................................. 192/89 B; 188/167; 192/70.27; 403/357; 403/371
[58] Field of Search ............... 192/89 B, 70.13, 70.27; 188/166, 167; 403/357, 371, 374

[56] References Cited

U.S. PATENT DOCUMENTS

| | | | |
|---|---|---|---|
| 2,138,169 | 11/1938 | Hunt | 192/70.27 |
| 2,222,508 | 11/1940 | Hunt | 192/70.27 |
| 2,234,756 | 3/1941 | Geyer | 192/70.27 X |
| 2,770,341 | 11/1956 | Wobrock | 192/89 B X |
| 3,595,355 | 7/1971 | Maucher et al. | 192/70.27 |
| 3,785,466 | 1/1974 | Murai et al. | 192/70.27 X |

FOREIGN PATENT DOCUMENTS 2042419  3/1972  Fed. Rep. of Germany .

Primary Examiner—William E. Tapolcai
Attorney, Agent, or Firm—Toren, McGeady, Stanger, Goldberg & Kiel

[57] ABSTRACT

The pressure plate unit for a motor vehicle friction clutch comprises a clutch housing (1a), a presser plate (3a) arranged in the clutch housing (1a) and guided non-rotatably but axially displaceably on the clutch housing (1a) and a clutch spring (13a) of substantially annular washer form arranged limitedly radially displaceably in the clutch housing (1a). The clutch spring is supported in the region of its external circumference axially on the clutch housing (1a) and on a diameter smaller than the diameter of the external circumference axially on the presser plate (3a). At least one radially resilient spring element is braced in between the clutch housing (1a) and the clutch spring (13a). The spring element holds the diaphragm spring in its original position in which the pressure plate unit was balanced in assembly, even during operation. The spring element can for example be a radially resilient spring sleeve or a U-shaped leaf spring which rests with one leg on the clutch housing and with the other leg on the diaphragm spring. Leaf springs which are secured with one end to the clutch housing or the diaphragm spring and are supported with the other end on the other component in each case are also suitable.

25 Claims, 18 Drawing Figures 4,579,210

1

PRESSURE PLATE UNIT FOR A MOTOR VEHICLE FRICTION CLUTCH

BACKGROUND OF THE INVENTION

The invention relates to a pressure plate unit for a motor vehicle friction clutch.

STATEMENT OF PRIOR ART

A pressure plate unit for a motor vehicle friction clutch is known from published German Patent Specification No. 2,042,419. On the clutch housing of the known clutch a presser plate is guided non-rotatably but axially displaceably, by means of tangential straps. A clutch spring of annular washer form is arranged between an annular stop of the clutch housing and the presser plate. The clutch spring rests with its external circumference on the annular stop and at a smaller diameter on the presser plate. In the installed condition the clutch housing of the pressure plate unit is secured to a fly-wheel of the internal combustion engine of the motor vehicle, and a friction disc coupled with the transmission is seated between the flywheel and the presser plate.

The pressure plate unit of such a friction clutch must be balanced after assembly. For this purpose bores are drilled in the clutch housing. Since the clutch spring, formed as dished or diaphragm spring, is seated with radial play in the housing, it can shift during operation so that unbalance occurs afresh.

OBJECT OF THE INVENTION

It is an object of the invention to indicate a pressure plate unit for a motor vehicle friction clutch in which the clutch spring, despite radial play, securely retains its position in relation to the clutch housing as determined in balancing initially.

SUMMARY OF THE INVENTION

In the pressure plate unit in accordance with the invention at least one radially resilient spring element is clamped in between the clutch housing and the clutch spring of annular washer form. If only one single spring element is provided, this presses the clutch disc radially against the clutch housing. The clutch spring still has radial play as before, but always returns into the same initial position by reason of the force of the spring element. If several spring elements arranged in distribution on the circumference of the clutch spring are provided, the clutch spring is centered in relation to the clutch housing. The pressure plate unit is balanced in the initial position of the clutch spring, and remains balanced even subsequently, since the clutch spring cannot shift during operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

2

Figure 2:
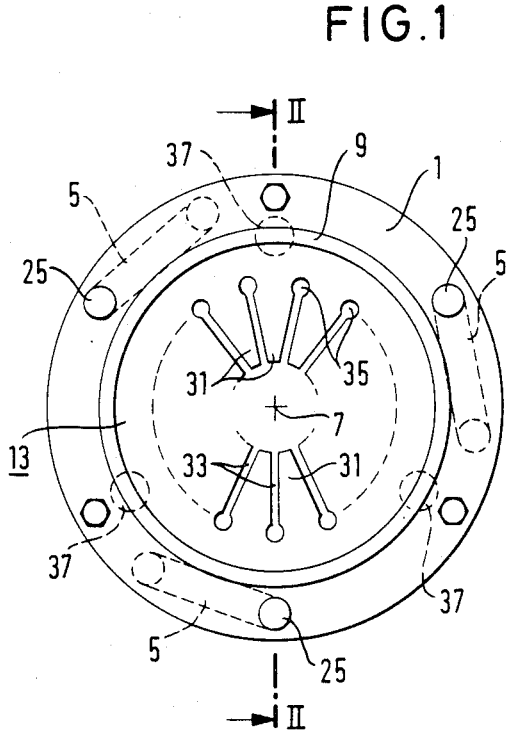
Figure 1:
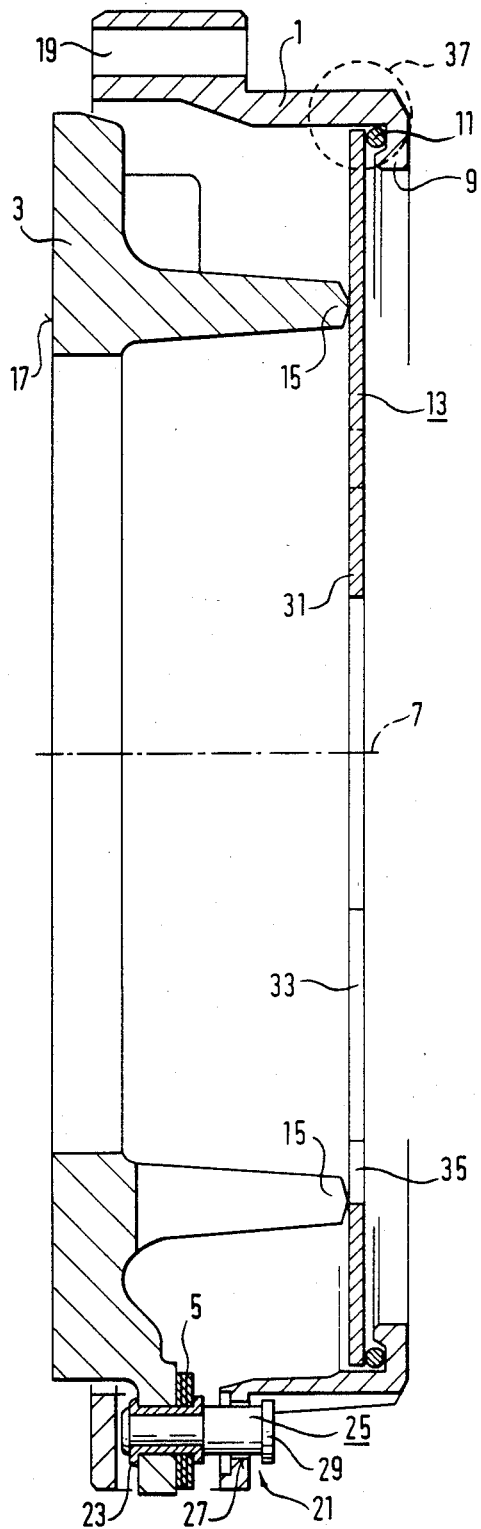
FIG. 1 shows a plan view of a pressure plate unit.
Figure 3:
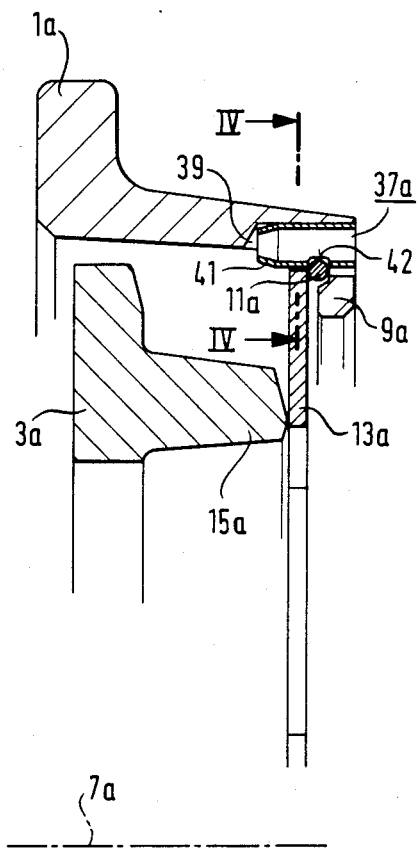
Figure 5:
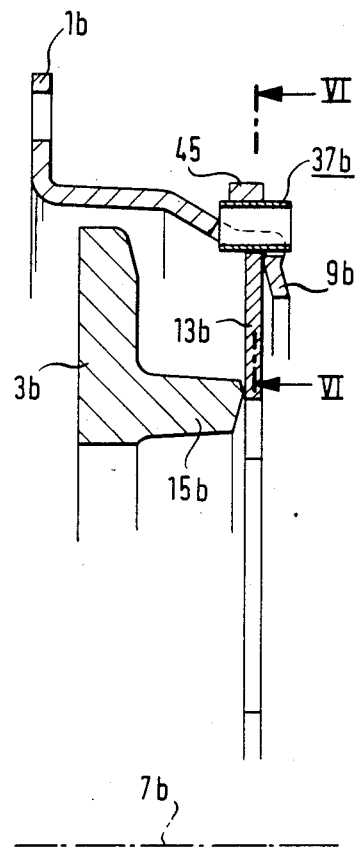
Figure 4:
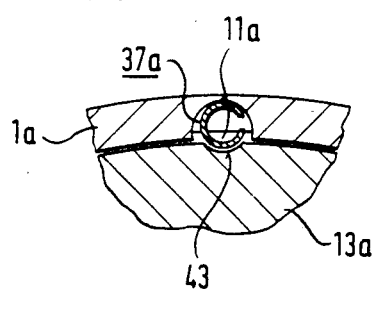
Figure 6:
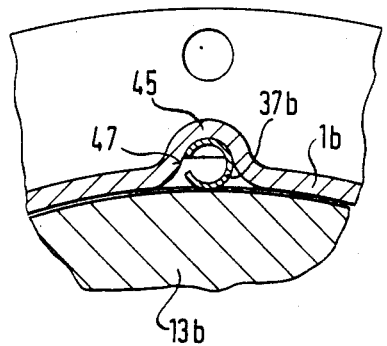
Figure 7:
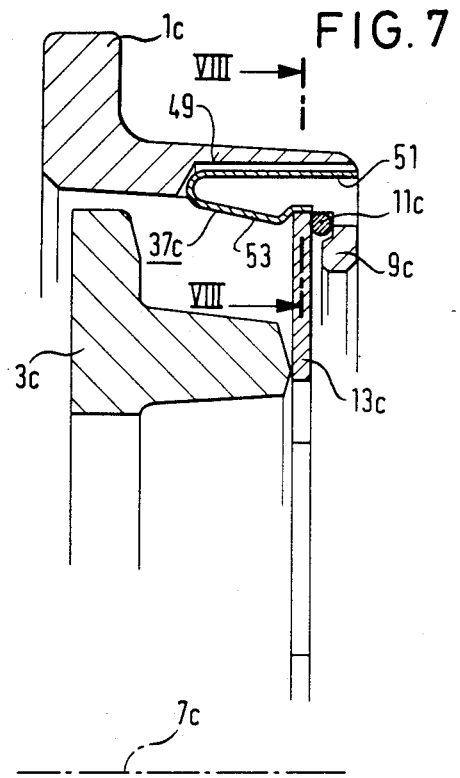
Figure 9:
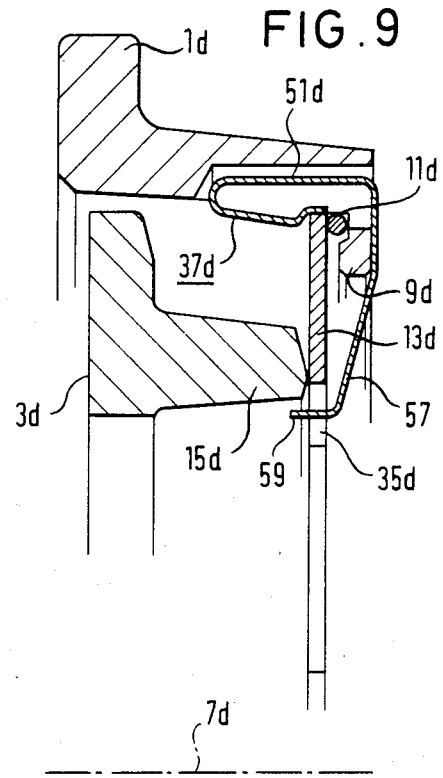
Figure 8:
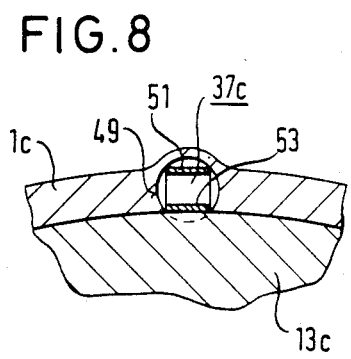
Figure 10:
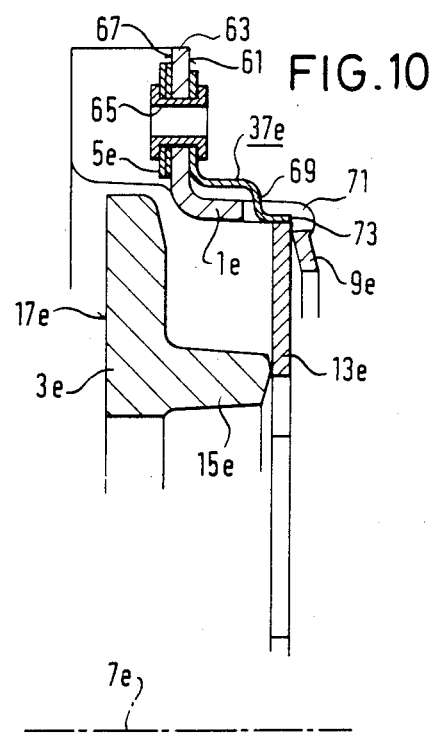
Figure 11:
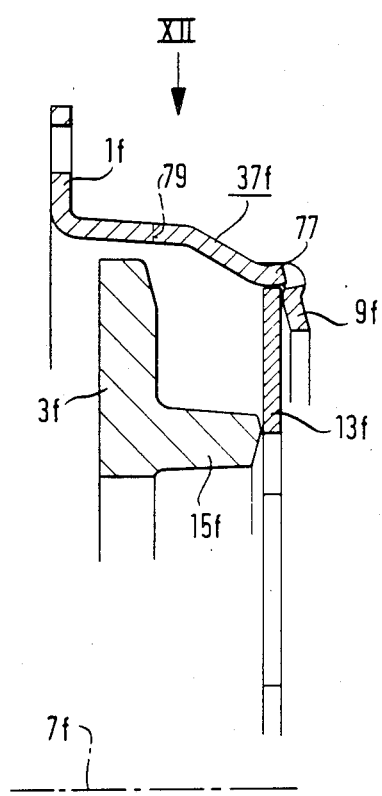
Figure 13:
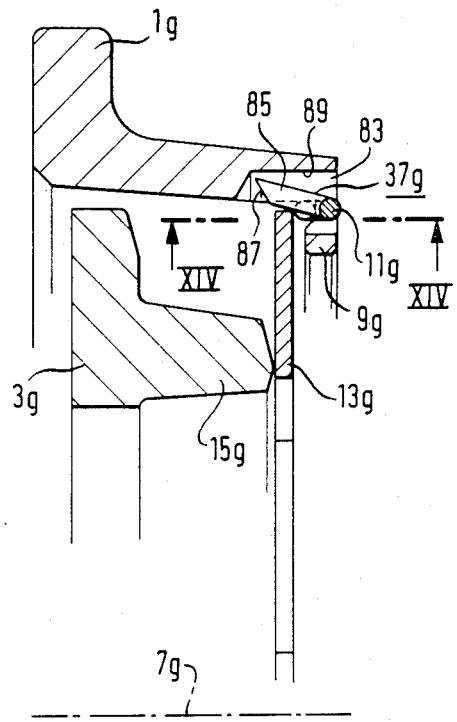
Figure 12:
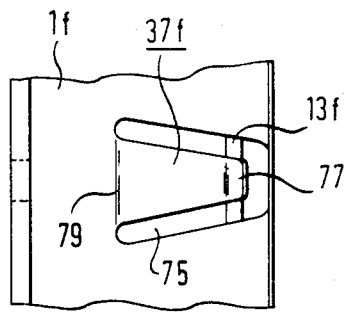
Figure 14:
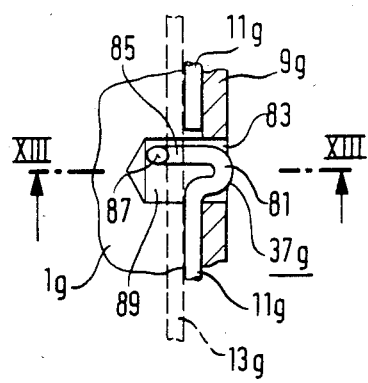
Figure 15:
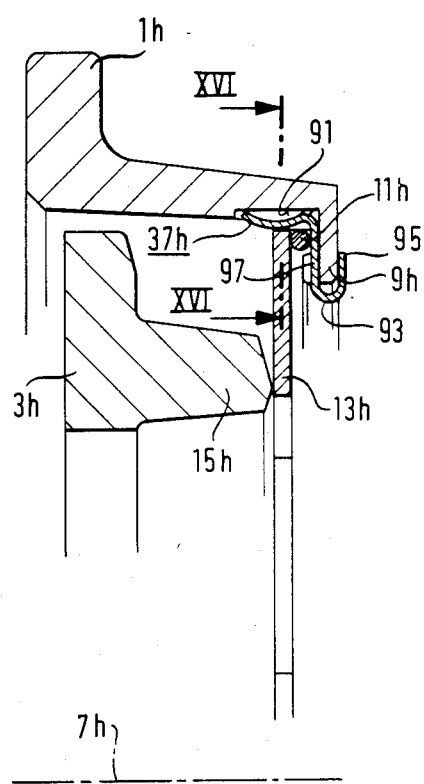
Figure 17:
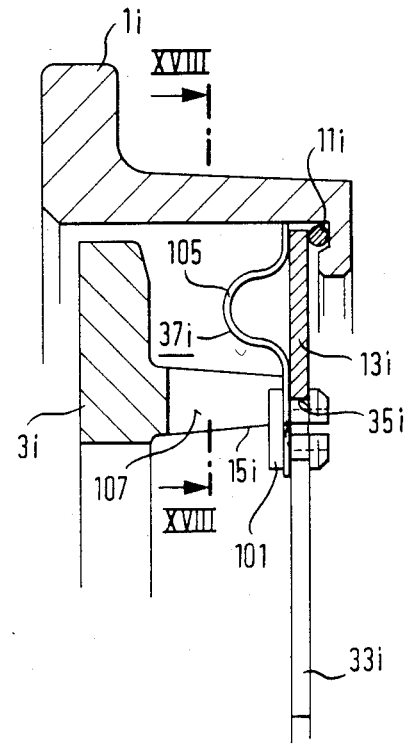
Figure 16:
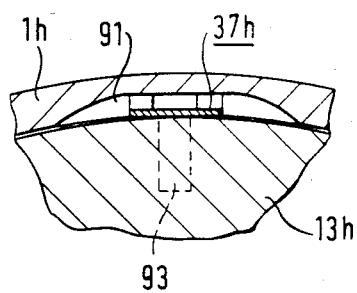
Figure 18:
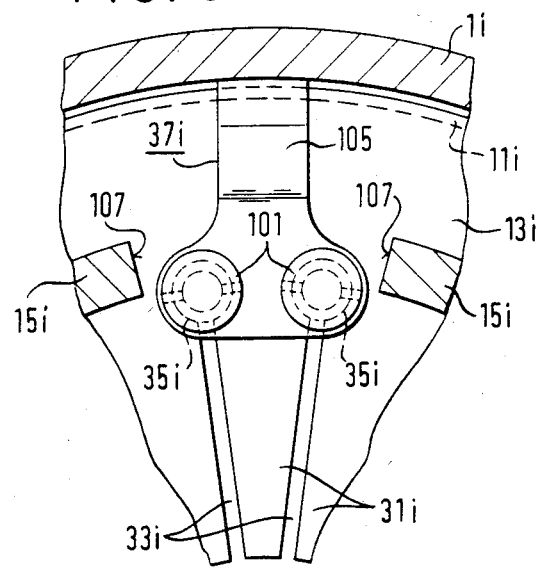

FIG. 2 shows a sectional view of the pressure plate unit according to FIG. 1, seen along a line II—II, FIG. 3 shows a sectional view of a first variant of the pressure plate unit according to FIG. 1, FIG. 4 shows a sectional view of the pressure plate unit according to FIG. 3, seen along a line IV—IV, FIG. 5 shows a sectional view of a second variant of the pressure plate unit according to FIG. 1, FIG. 6 shows a sectional view of the pressure plate unit according to FIG. 5, seen along a line VI—VI, FIG. 7 shows a sectional view of a third variant of the pressure plate unit according to FIG. 1, FIG. 8 shows a sectional view of the pressure plate unit according to FIG. 7, seen along a line VIII—VIII, FIG. 9 shows a sectional view of a variant of the pressure plate unit according to FIG. 7, FIG. 10 shows a sectional view of a fourth variant of the pressure plate unit according to FIG. 1, FIG. 11 shows a sectional view of a fifth variant of the pressure plate unit according to FIG. 1, FIG. 12 shows a lateral elevation of the pressure plate unit according to FIG. 11, seen in the direction of an arrow XII, FIG. 13 shows a sectional view of a sixth variant of the pressure plate unit according to FIG. 1, seen along a line XIII—XIII in FIG. 14, FIG. 14 shows a sectional view of the pressure plate unit according to FIG. 13, seen along a line XIV—XIV, FIG. 15 shows a sectional view of a seventh variant of the pressure plate unit according to FIG. 1, FIG. 16 shows a sectional view of the pressure plate unit according to FIG. 15, seen along a line XVI—XVI, FIG. 17 shows a sectional view of an eighth variant of the pressure plate unit according to FIG. 1, and FIG. 18 shows a sectional view of the pressure plate unit according to FIG. 17, seen along a line XVIII—XVIII.

DESCRIPTION OF THE PREFERRED EMBODIMENTS

FIGS. 1 and 2 show the assembly in principle of a pressure plate unit of a motor vehicle friction clutch having a somewhat annular clutch housing 1 which encloses a presser plate 3. The presser plate 3 is guided on the clutch housing 1 non-rotatably but displaceably in the direction of a rotation axis 7 of the clutch, by means of tangential straps 5. The clutch housing 1 carries on its end axially remote from the presser plate 3 a radially inwardly extending annular stop 9, against which a clutch spring of annular washer form, here a diaphragm spring 13, rests in the region of its external circumference through a support ring 11. On its side axially facing the diaphragm spring 13 the presser plate 3 carries support flanges 15 which abut on the diaphragm spring on a diameter smaller than the external diameter of the diaphragm spring 13. The other components of the motor vehicle friction clutch, especially a fly-wheel fitted on the crankshaft of the motor vehicle internal combustion engine and forming a counter-plate and a clutch friction disc arranged axially between the fly-wheel and a friction face 17 of the presser plate 3 and seated axially displaceably on the input shaft of the transmission, are not illustrated. Holes for securing screws, with which the clutch housing 1 is screwed to the fly-wheel, are represented at 19 on the external circumference of the clutch housing. The friction clutch as represented is a clutch operated by pulling. The diaphragm spring 13 thus clamps the clutch friction disc in between the presser plate 3 and the fly-wheel. The clutch is released by a releaser system (not shown) in that the inner edge of the diaphragm spring 13 is moved axially away from the presser plate 3.

At the bottom of FIG. 2 there can be seen a release movement limiting device 21 having a hollow rivet 23 holding the tangential straps on the presser plate 3 and a headed rivet 25 passing through the hollow rivet 23. The rivet 25 passes through an opening 27 of the clutch housing 1 and engages behind it with its head 29. The diaphragm spring 13 has radially inwardly extending tongues 31 which are separated from one another by radial separating slots 33. The separating slots 33 terminate at their radially outer ends in circular apertures 35. The support flanges 15 of the presser plate 3 lie against the diaphragm spring 13 in the region of these circular apertures. In place of the diaphragm spring 13 it is also possible to use a dished spring built up without tongues, which is then moved away from the presser plate by additional releaser elements. The support ring 11 compensates slight differences of diameter of the diaphragm spring, occurring during the release operation, by a rolling movement. It is however also possible to omit the support ring 11.

The diaphragm spring 13 is seated with slight radial play in the clutch housing 1. In order to hold the diaphragm spring 13, despite the radial play, in a predetermined position in relation to the clutch housing 1, radially acting spring elements 37, which are merely indicated by chain-line circles in FIGS. 1 and 2, are braced in between the clutch housing 1 and the diaphragm spring 13. Different embodiments of the spring elements will be explained in greater detail below. In the example of embodiment according to FIGS. 1 and 2 three spring elements 37 arranged in distribution in the circumferential direction are provided which hold the diaphragm spring 13 centered between them in relation to the rotation axis 7. Alternatively even more spring elements or even only one single spring element can be provided. The single spring element braces the diaphragm spring 13 eccentrically of the rotation axis 7 against the wall of the clutch housing 1 lying radially opposite to it. After the balancing of the pressure plate unit the spring element 37 or elements hold the diaphragm spring 13 in the balanced position.

Examples of embodiment of the spring elements 37 will be described below. Parts of like effect are here designated with the same reference numerals, but with an additional letter for differentiation. For the more detailed explanation of the assembly and the manner of operation referene is made to the description of FIGS. 1 and 2.

FIGS. 3 and 4 show a first variant of a spring element formed as a longitudinally slotted spring sleeve 37a. The spring sleeve 37a is seated in a pocket 39 of the clutch housing 1a which is radially open to the diaphragm spring 13a. The pocket 39 is open to the face of the clutch housing 1a which carries the annular stop 9a, so that the spring sleeve 37a can be inserted, with sleeve axis parallel to the rotation axis 7a, into the pocket 39. As illustrated at 41, the spring sleeve 37a can be provided with an entry taper which facilitates the insertion of the spring sleeve 37a into the pocket 39. The spring sleeve 37a has a tangential slot 42 in which the support ring 11a engages. Thus the support ring 11a fixes the spring sleeve 37a in the axial direction in the pocket. On the other hand the spring sleeve 37a engages in an aperture 43 on the external circumference of the diaphragm spring 13a and secures the diaphragm spring 13 against rotation.

FIGS. 5 and 6 likewise show a spring element formed as axially slotted spring sleeve 37b. The clutch housing 1b is formed as a sheet metal shaped part; its stop ring 9b is domed towards the diaphragm spring 13b so that a separate support ring becomes superfluous. A bar 45 extending in the circumferential direction is cut out of the circumferential wall of the clutch housing by cuts extending in the circumferential direction. The bar 45 is domed radially outwards and forms a pocket 47 open radially inwards and towards the adjacent face of the clutch housing 1b. The spring sleeve 37b is inserted into this pocket with axis parallel to the rotation axis 7b. The bar 45 lies against the spring sleeve 37b over about half its circumference.

FIG. 7 and 8 show a pressure plate unit the spring element of which is formed as a U-shaped leaf spring 37c. The leaf spring 37c again is seated in a pocket 49 of the clutch housing 1c which is open radially inwards and to the end face of the annular stop 9c. It comprises two legs 51 and 53 lying radially one above the other in the pocket 49. Its radially outer leg 51 lies against the bottom of the pocket 49; its free end terminates flush with the end face of the clutch housing 1c carrying the annular stop 9c. The radially inner leg 53 is provided between the diaphragm spring 13c and the presser plate 3c with a Z-shaped angled portion 55 pointing to the diaphragm spring 13c, forming a stop face which fixes the leaf spring 37c axially in the pocket 49. The leg 53 lies resiliently against the external circumference of the diaphragm spring 13c.

FIG. 9 shows a variant of the otherwise similarly formed leaf spring 37c. This leaf spring 37d carries on its radially outer leg 51d, which corresponds to the leg 51, a continuation 57 which extends radially inwards beyond the annular stop 9d as far as the diaphragm spring 13d. The end of the continuation 57 remote from the leg is bent over towards the diaphragm spring 13d and engages with a nose 59 in one of the circular apertures 35d of the diaphragm spring 13d. Otherwise the pressure plate unit corresponds to the variant according to FIGS. 7 and 8.

FIG. 10 shows a pressure plate unit having a spring element likewise formed as leaf spring 37e. The clutch housing 1e is made as a sheet metal shaped part and lies with its annular stop 9e, which is domed towards the diaphragm spring 13e, directly upon the diaphragm spring 13e. The leaf spring 37e has an angular form and is secured by means of a rivet 65 with its one leg on the side 61, facing away from the presser plate 3e, of a wall part 63 of the clutch housing 1e extending parallel with the friction face 7e of the presser plate 3e. On the side 67 of the wall part 63 facing the friction face 17e of the presser plate 3e the housing end of one of the straps 5e is secured, with which straps the presser plate 3e is guided on the clutch housing 1e. The other leg 69 of the leaf spring 37e engages through an opening 71 of the clutch housing 1e and lies with its free end 73, which points away from the presser plate 3e, on the external circumference of the diaphragm spring 13e. Thus the rivet 65 serves for the securing of both the leaf spring 37e and the tangential strap 5e.

FIGS. 11 and 12 show a spring element formed as leaf spring 37f. The leaf spring 37f is punched free out of a circumferential wall of the clutch housing 1f, formed as sheet metal shaped part, by a substantially U-shaped punched slot 75. The leaf spring 37f lies with its free end 77 radially resiliently against the external circumference of the diaphragm spring 13f and extends substantially in the direction of the axis of rotation 7f, starting from its foot point 79 lying in the region of the presser plate 3f. The annular stop 9f is again domed towards the diaphragm spring 13f and lies directly against the latter.

FIGS. 13 and 14 show a variant in which the spring element is formed by a free end section 37g of the support ring 11g which in this case is open. The end section 37g of the support ring 11g is bent out of the plane of the support ring and forms a U-shaped loop 81 directed away from the diaphragm spring 13g. The loop 81 engages in an axial opening 83 of the annular stop 9g of the clutch housing 1g. The loop 81 has a free leg 85 protruding substantially axially to the diaphragm spring 13g and resting radially resiliently on the external circumference of the diaphragm spring 13g. The free end of the leg 85 has an oblique face 87 extending obliquely at an acute angle to the rotation axis 7g, facilitating the installing of the diaphragm spring 13g. Moreover the free leg 85 is seated in a pocket 89 of the clutch housing 1g which is radially open to the diaphragm spring 13g.

FIGS. 15 and 16 show a pressure plate unit with a spring element formed as a rectangular leaf spring 37h and seated in a radially inwardly open pocket 91 on the internal circumference of the clutch housing 1h. Seen from the diaphragm spring 13h the leaf spring 37h is convexly domed. It bears with its edges extending in the circumferential direction of the clutch housing 1h on the bottom of the pocket 91 and lies with its doming resiliently on the external circumference of the diaphragm spring 13h. On the side of the leaf spring 37h adjacent to the annular stop 9h there is formed a substantially U-shaped clip 93 which clamps the annular stop 9h in between its legs 95 and 97. Thus the leaf spring 37h can be secured to the clutch housing 1h before the installation of the diaphragm spring 13h and also of the support ring 11h.

FIGS. 17 and 18 show a pressure plate unit in which the spring element formed as leaf spring 37i is secured to the diaphragm spring 13i. The leaf spring 37i extends substantially radially and is held at its inner end non-rotatably on the diaphragm spring 13i by means of two snap anchors 101. The snap anchors 101 pass through apertures 35i of the diaphragm spring which are adjacent in the circumferential direction. As mentioned, the apertures 35i limit the radially outer ends of the separating slots 33i between adjacent tongues 31i of the diaphragm spring 13i. The leaf spring lies, in the region of the snap anchors 101, flat against the diaphragm spring 13i. The leaf spring 37i extends in the region of its radially outer free end likewise parallel with the diaphragm spring 13i and rests with its radially outer end resiliently against the inner periphery of the clutch housing. In its middle region 105 between its two radial ends the leaf spring 37i is domed away from the diaphragm spring 13i, to generate the radial spring force.

The support flanges 15i of the presser plate 3i extend on a diameter in the region of the snap anchors 101 and the adjoining regions of the leaf spring 37i. The snap anchors 101 and the adjoining regions of the leaf spring 37i engage in an aperture 107 open to the diaphragm spring 13i or in an interruption of the support flange. The leaf spring 37i and its securing members thus form a securing for the leaf spring 13i against rotation.

While specific embodiments of the invention have been shown and described in detail to illustrate the application of the inventive principles, it will be understood that the invention may be embodied otherwise without departing from such principles.

What is claimed is:

1. Pressure plate for a motor vehicle friction clutch, operated by pulling comprising:
   (a) a substantially annular clutch housing,
   (b) a presser plate arranged in the clutch housing and guided non-rotatably but axially displaceably on the clutch housing,
   (c) a clutch spring of substantially annular washer form arranged limitedly radially displaceably in the clutch housing, which spring is supported in the region of its external circumferential diameter axially on the clutch housing and on a diameter smaller than the external circumferential diameter axially on the presser plate, and
   (d) at least one radially resilient spring element braced radially in between the clutch housing and the clutch spring.

2. Pressure plate unit according to claim 1, wherein several spring elements distributed in the circumferential direction of the clutch housing are provided.

3. Pressure plate unit, according to claim 1, wherein said at least one spring element comprises a plurality of said spring elements with each said spring element seated in a pocket of the clutch housing, said pocket being radially inwardly open to the clutch spring and fixing the spring element in the circumferential direction of the clutch housing.

4. Pressure plate unit according to claim 3, wherein the pocket has an axially open insertion opening for the spring element on the side of the clutch spring axially remote from the presser plate.

5. Pressure plate unit according to claim 4, wherein the clutch housing is formed as a sheet metal shaped part out of which a strip extending in the circumferential direction is stamped free and bent radially outwards for the formation of the pocket.

6. Pressure plate unit according to claim 4, wherein the spring element is made as a radially resilient spring sleeve and is held in the pocket with the axis of the sleeve extending approximately axially of the clutch housing.

7. Pressure plate unit according to claim 6, wherein the clutch spring has for each said spring sleeve a radial groove on its external circumference, in which the spring sleeve engages radially.

8. Pressure plate unit according to claim 6, wherein the clutch housing comprises on its end face axially adjacent to the clutch spring an annular stop reaching radially inwards into the region of the clutch spring, wherein a support ring is arranged axially between the annular stop and the supported region of the external circumference of the clutch spring and wherein each said spring sleeve has on its side facing the support ring a tangential aperture in which the support ring engages radially.

9. Pressure plate unit according to claim 4, wherein the spring element is formed as a U-shaped leaf spring and comprises two legs connected with one another in U-form, arranged one above the other in the pocket radially of the clutch housing and extending substantially axially in relation to the clutch housing, the radially outer leg of said two legs being supported on the clutch housing and the radially inner leg on the outer edge of the clutch spring.

10. Pressure plate unit according to claim 9, wherein the legs are connected with one another at their end facing the presser plate and wherein on the radially inner leg a stop face facing axially to the clutch spring is provided axially between the presser plate and the clutch spring.

11. Pressure plate unit according to claim 9, wherein said two legs are connected with one another at their end facing the presser plate, wherein the radially outer leg of said two legs has a continuation protruding radially inwards on the side of the clutch spring axially remote from the presser plate and wherein the continuation comprises a nose bent over towards the clutch spring and engaging in an opening of the clutch spring to secure the clutch spring against rotation.

12. Pressure plate unit according to claim 3, wherein the spring element is formed as a substantially rectangular leaf spring which, seen from the clutch spring, is convexly domed and, seated in the pocket, bears with its doming on the external circumference of the clutch spring.

13. Pressure plate unit according to claim 12, wherein the clutch housing has on its end face axially adjacent to the clutch spring an annular stop reaching radially inwards into the region of the clutch spring and wherein on the side of the leaf spring adjacent to the annular stop there is formed a substantially U-shaped clip tab which clamps in the annular stop between its legs.

14. Pressure plate unit according to claim 1, wherein the clutch housing has on its end axially adjacent to the clutch spring an annular stop reaching radially inwards into the region of the clutch spring, wherein an open support ring is arranged axially between the annular stop and the supported region of the external circumference of the clutch spring, and wherein at least one end section of the support ring is bent over axially towards the clutch spring and rests radially resiliently on the external circumference of the clutch spring.

15. Pressure plate unit according to claim 14, wherein the end section which rests resiliently radially on the clutch spring is formed by one leg of a substantially U-shaped loop formed on the end of the support ring and wherein the loop is supported in an axial aperture of the annular stop.

16. Pressure plate unit according to claim 14 or 15, wherein on the free end of the end section of the support ring an oblique face extending at an acute angle to the axial direction of the clutch spring is provided to facilitate the fitting of the clutch spring.

17. Pressure plate unit according to claim 1, wherein the spring element is formed as a radially resilient leaf spring held at its one end on the clutch housing and bearing through a radial opening of the clutch housing on the external circumference of the clutch spring.

18. Pressure plate unit according to claim 17, wherein the clutch housing is formed as a sheet metal shaped part and the leaf spring is formed as a sheet metal tab punched free out of the sheet metal shaped part.

19. Pressure plate unit according to claim 18, wherein the sheet metal tab extends substantially axially and merges in the region of the presser plate into the clutch housing.

20. Pressure plate unit according to claim 17, wherein the leaf spring is riveted on the outer side of the clutch housing.

21. Pressure plate unit according to claim 20, wherein the presser plate is held non-rotatably but axially displaceably on the clutch housing by several tangential straps, wherein the ends of the tangential straps remote from the presser plate are secured by means of rivets on a surface of a wall of the clutch housing, said surface being parallel to a friction surface of the presser plate and facing the presser plate, and wherein the leaf spring is secured on the clutch housing on the side of the wall remote from the tangential strap by means of the rivets securing the tangential strap.

22. Pressure plate unit according to claim 1, wherein the spring element is formed as a radially resilient leaf spring secured to the clutch spring.

23. Pressure plate unit according to claim 22, wherein the leaf spring extends substantially radially and in the region of its radially inner end rests flat on the clutch spring and is secured to the clutch spring, and wherein the leaf spring rests with its radially outer end on the clutch housing and between its ends is domed axially away from the clutch spring.

24. Pressure plate unit according to claim 22, wherein the clutch spring is formed as a diaphragm spring with a plurality of radially inwardly pointing tongues formed by radial slots, wherein the slots terminate in circular openings of the diaphragm spring in the region of abutment of the presser plate and wherein the leaf spring is anchored in two openings which are adjacent in the circumferential direction.

25. Pressure plate unit according to claim 23 or 24, wherein the presser plate comprises at least one support flange extending in the circumferential direction, protruding axially to the clutch spring and resting on the clutch spring, wherein the support flange has at least one aperture open to the clutch spring and wherein the leaf spring engages in the aperture.

* * * * *